Oct. 10, 1950     K. DANNENBERG     2,525,527
RING MAIN DISTRIBUTION PROTECTION SYSTEM
Filed June 28, 1945
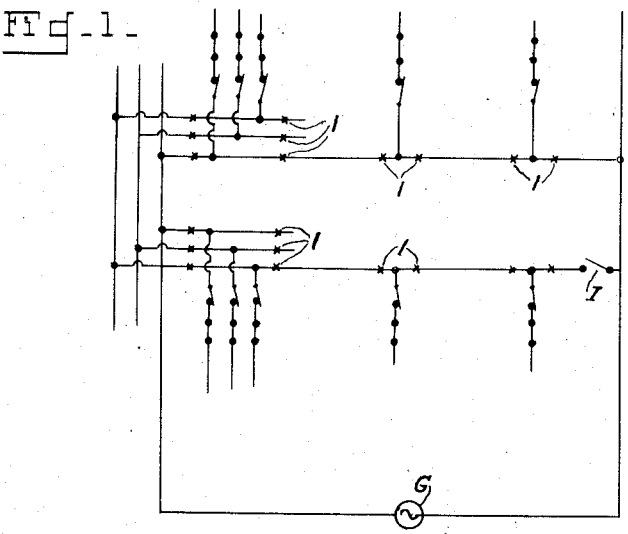
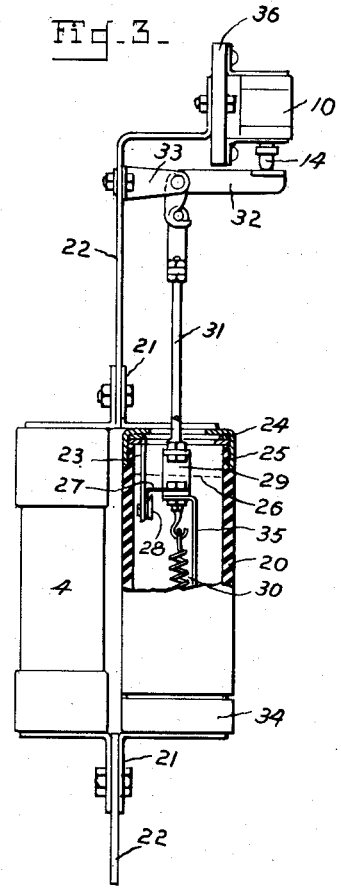
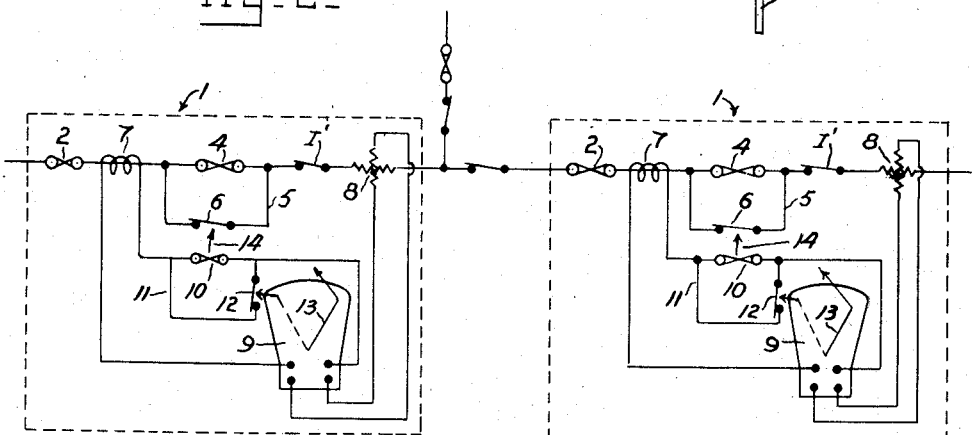
INVENTOR-
Kurt Dannenberg
By
ATTORNEY Patented Oct. 10, 1950

2,525,527

UNITED STATES PATENT OFFICE 2,525,527

RING MAIN DISTRIBUTION PROTECTION SYSTEM

Kurt Dannenberg, Etruria, Stoke-on-Trent, England

Application June 28, 1945, Serial No. 602,129
In Great Britain June 22, 1944

Section 1, Public Law 690, August 8, 1946
Patent expires June 22, 1964

3 Claims. (Cl. 175—294)

The primary object of the present invention is the provision of ring main systems (open ring main electrical systems or open spurs thereof or closed ring main systems or closed spurs thereof) having fuse protection in the ring near tee-offs which supply power from the main circuit to electrical loads.

The invention will be described with reference to the accompanying drawings wherein:

Fig. 1 is a diagram of a ring main comprising a closed section or spur and an open section or spur provided at the points 1 in the main circuit, i. e., at each side of each tee-off from each phase circuit connection in the main circuit closely adjacent the connection of each distribution or load circuit to the main circuit, with fuse protection in accordance with the invention;

Fig. 2 is a diagram showing details of the fuse protection arrangements 1, 1 at the sides of the tee-off from a closed ring main or closed section thereof, said arrangements being in accordance with one way of carrying out the invention; and Fig. 3 is a side elevation, partly in section, of a trip-released switch adapted under fault or overload conditions in the ring main, section or spur thereof to impose the fault or overload current on a fuse.

Each system fuse protection arrangement shown in Fig. 2 comprises a high rupturing capacity fuse 2 in series with a main circuit fuse 4. The fuses 4 are shunted by circuits 5 comprising normally closed switch 6. Current transformers and potential transformers, 7 and 8 respectively, are connected to the main circuit, as shown in Fig. 2, for supplying power for energizing power responsive devices, such as wattmeters 9 and in the circuits of the current transformers are trip devices 10 shunted by circuits 11 comprising normally closed switches 12. The movable members 13 of the wattmeters 9 are so associated with the switches 12 that they open them in certain circumstances and the movable members 14 of the trip devices are so associated with the switches 6 that they open them when their trip devices are energised following operation of the watt meters.

The watt meters at the left hand sides of the tee-offs effect energisation of their respective trip devices in response to a predetermined power flow from the left hand side of a source of electrical power supply, such as a generator G, and the watt meters at the right hand sides of the tee-offs effect energisation of their respective trip devices in response to a predetermined power flow from the right hand side of the source of electrical power supply. Moreover, the operation of the trip devices may be graded in time in accordance with system conditions and predetermined overload conditions, such as a fault current, which in turn depends on the distance of the fault from the generating point. This grading may be effected by grading the transformers, by grading the inverse time current characteristics of the trip devices, by grading the degree of response of the watt meters or equivalent members to the energising power or by a combination of two or more of these gradings.

In the case of fuse protective system arrangements with substantially matched integers overload, such as a fault current flow to the right produces operation of the left hand watt meters to cause energisation of their trip devices and overload, such as a fault, current flow to the left produces operation of the right hand watt meters to cause energisation of the corresponding trip devices.

When an overload which might be injurious, such as a fault, occurs the wattmeters in the main phase(s) as far as the faulty tee-off phase(s), having regard to the direction of power flow, are energised sufficiently to cause their movable elements to open the switches 12. Current from the transformers 7 then energise the trip devices 10 with the result that the members 14 of the latter open the switches 6. This puts the fuses 4 in full circuit with the result that they operate. As above stated regard is had to the direction of power flow. If it be to the right only the left hand fuses 4 as far as the faulty phase operate and if it be to the left only the right hand fuses 4 as far as the faulty phase operate.

The fuses 2 are current limiting fuses of high current rating which on light and medium fault currents are so slow that they do not operate provided the fuses 4 operate, whilst on very heavy fault currents the fuses 2 operate before the elements 9, 10 and 6 are able to do so, said fuses 2 exhibiting current limiting features, i. e., they cut off the fault current before it reaches peak value. The fuses 2 are only necessary where the fault current is likely to be considerable.

If grading, effected as previously described for the system protective arrangements be employed, the arrangements are constructed and arranged for graded operation in inverse time ratio relative to the position of each respective protective arrangement to the other protective arrangements of the system from the source of electrical power supply in the direction of power flow. This grading is such that the most leftward fuse 4 is the last to operate for power flow to the right and the remaining left hand fuses are successively faster, whilst for power flow to the left the grading is such that the most rightward fuse 4 is the last to operate and the remaining right hand fuses are successively faster. This confines operation to one protective arrangement only.

A modification of the above comprises the balanced current transformer method employing pilot wiring for energising the trip devices from the current transformers. In this case the secondaries of the transformers operate the devices 10 when there is out of balance current.

Each device can be fitted with a striker pin or pins or the like to ensure three phase clearance of the circuit under all circuit conditions by opening the conventional ring main isolator I'.

Although wattmeter type instruments have been shown any other suitable known instrument responsive in the requisite direction to directional power flow may be employed instead of the wattmeter instruments.

The current transformer 7 of each left hand unit and/or the trip device 10 thereof are so graded with respect to corresponding elements in remaining units that the devices 10 operate with progressively greater time lag as they approach the open end of the spur. Conversely, the transformers 7 of each right hand unit and/or the trip device 10 thereof are so graded with respect to corresponding elements in remaining units that the devices 10 therein operate with progressively greater time lag as they approach the other end of the spur. This arrangement results in only that fuse 4 on the generator side of the faulty tee-off circuit connection blowing, the remaining protective arrangement being inoperative.

The trip devices 10 may be of any suitable kind, known in the art, wherein low wattages impressed on them result in the movement of an element such as a striker. Such a device comprises a striker or plunger which is driven forward by explosive, said explosive being touched off by a heating element embedded in it and energised by low wattage.

The assembly shown in Fig. 3 is a practical way of constructing and associating the integers 10, 6 and 4. The integer 6, which is a switch or isolator, comprises an oil filled, insulating sheath 20 having terminal tags 21 at its ends enabling it to be mounted on bars 22 in the main circuit. The bars may be supported by insulators. A conducting tag 23 on a ring 24 which makes electrical contact with the upper ferrule 25 of the sheath dips into the oil, indicated by 26. The tag 23 has one end of silver conducting elements 27 and beneath them a knife blade 28 attached to it in such a position that the elements and the blade lie in oil. The other end of the elements is attached to a yoke 29. A spring 30 tends to pull the yoke and the said end of the elements into the oil but is prevented from so doing by a non-conducting rod 31 held by a latch 32. The latch is pivoted on a bracket 33 mounted on the upper bar 22. The lower end of the spring is attached to the lower ferrule 34 of the sheath. A flexible conductor 35 is electrically connected to this ferrule and to the yoke.

The terminal tags of the fuse 4 are mounted on the bars 22. Therefore, the fusible element(s) of the fuse are shunted by the elements 21, 23, 22, 35, 34, 21. These elements provide the shunt circuit 5.

The trip device 10 is mounted on a non-conducting base 36 which in turn is mounted on the upper end of the upper bar 22. The trip device is of known construction. It operates when a low wattage is impressed on it. The low wattage causes a heating element within it to ignite an explosive and the gases produced urge the striker 14 outwards.

The said device is energised in any of the ways previously described. When the striker is driven outwards it trips the latch. This allows the spring 30 to pull the yoke 29 downwards with the result that the knife edge 28 severs the elements 27 in the oil and the fuse 4 is put fully in the main circuit.

The invention is applicable either to high voltage systems or to low voltage and to plural phase alternating current systems as will be obvious and as is schematically illustrated in Fig. 1. Whatever design for switch 6 is employed, it is preferably of quick-break isolator type. Fuse 4 is of low rating and, therefore, operates quickly.

What I claim is:

1. In a ring main electrical system having a main circuit and a tee-off circuit connection to the main circuit for supplying power to an electrical load, fuses, means for connecting one of said fuses in series with the main circuit on each side of and closely adjacent the tee-off circuit connection, means including a shunt circuit for each of said fuses comprising a separate normally closed switch shunting each of said fuses for normally carrying the load current of said main circuit, means including a circuit opening device for each of said switches operable in response to predetermined overload conditions in said electrical system for opening each respective switch, each of said last-mentioned means including a power responsive device constructed and arranged for operating said circuit opening device to open the respective normally closed switch of said shunt circuit means, and means for energizing each of said power responsive devices on each side of said tee-off circuit connections for response to power flow only from its respective side over said main circuit and for graded response in inverse time ratio in the direction of power flow relative to other of said power responsive devices from the source of electric power supply.

2. In a closed ring main electrical system having a source of electrical power supply connected to a main circuit and a plurality of tee-off circuit connections to the main circuit for supplying power to electrical loads, arrangements including fuses for protecting said system against injurious overloads, means for connecting one of said fuses in series with said main circuit on each side of and closely adjacent each of the tee-off circuit connections, means including a shunt circuit for each of said fuses comprising a separate normally closed switch shunting each of said fuses for normally carrying the load current of said main circuit, means including a circuit opening device for each of said switches operable in response to predetermined overload conditions in said electrical system for opening each respective switch, each of said last-mentioned means including a power responsive device constructed for operating said circuit opening device to open the respective normally closed switch of said shunt circuit means, means for energizing said power responsive devices in response to the electric power transmitted over said main circuit in which its respective fuse is connected for response to a predetermined overload, and said means including said power responsive devices on each side of said tee-off circuit connections being responsive to power flow only from its respective side and being graded for opening said main circuit in inverse time ratio in the direction of power flow relative to other of said power responsive devices from the source of electrical supply.

3. In an open ring main plural phase alternating current electrical system having a source of electrical power supply connected to a main circuit and a plurality of tee-off circuit connections to the main circuit for each phase for supplying power to electrical loads, arrangements including fuses for protecting said system against injurious overloads, means for connecting one of said fuses in series with each phase of said main circuit on each side of and closely adjacent each of said tee-off circuit connections, means including a shunt circuit for each of said fuses comprising a separate normally closed switch shunting each of said fuses for normally carrying the load current of said main circuit, means including a circuit opening device for each of said switches operable in response to predetermined overload conditions in said electrical system for opening each respective switch, each of said last-mentioned means including a power responsive device constructed and arranged for operating said circuit opening device to open the respective normally closed switch of said shunt circuit means, means for energizing each of said power responsive devices in response to the electric power transmitted over each phase of said main circuit in which its respective fuse is connected for response to a predetermined overload in said phase of said main circuit, said power responsive device on each side of said tee-off circuit connection being responsive to power flow only from its respective side and being graded for opening said main circuit in inverse time ratio in the respective direction of power flow relative to other of said power responsive devices from the source of electrical power supply.

KURT DANNENBERG.

REFERENCES CITED

The following references are of record in the file of this patent:

UNITED STATES PATENTS

| Number | Name | Date |
|---|---|---|
| Re. 14,881 | Schweitzer | June 8, 1920 |
| 1,294,621 | Conrad | Feb. 18, 1919 |
| 1,532,004 | Troger | Dec. 31, 1925 |
| 1,887,695 | Medlin | Nov. 15, 1932 |
| 2,303,581 | Rudd | Dec. 1, 1942 |
| 2,319,279 | Watkins | May 18, 1943 |
| 2,330,690 | Dannenberg | Sept. 28, 1943 |
| 2,337,837 | Reagan | Dec. 28, 1943 |

FOREIGN PATENTS

| Number | Country | Date |
|---|---|---|
| 27,312 | Great Britain | Dec. 27, 1911 |